US009270016B2

(12) United States Patent
Stoneback et al.

(10) Patent No.: US 9,270,016 B2
(45) Date of Patent: Feb. 23, 2016

(54) INTEGRATED ANTENNA SYSTEM

(75) Inventors: Matthew A. Stoneback, Seattle, WA (US); Joseph A. Marshall, IV, Kent, WA (US); Daniel Joseph Sego, Shoreline, WA (US); Otis Franklin Layton, Bonney Lake, WA (US); Kevin O'Brien Gaw, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 393 days.

(21) Appl. No.: 13/183,808

(22) Filed: Jul. 15, 2011

(65) Prior Publication Data

US 2013/0016019 A1   Jan. 17, 2013

(51) Int. Cl.
| | |
|---|---|
| *H01Q 1/40* | (2006.01) |
| *H01Q 1/28* | (2006.01) |
| *B32B 37/00* | (2006.01) |
| *H01Q 1/38* | (2006.01) |
| *H01Q 13/10* | (2006.01) |
| *B29C 70/40* | (2006.01) |
| *B29C 70/86* | (2006.01) |
| *B29C 70/88* | (2006.01) |
| *B29C 70/30* | (2006.01) |

(52) U.S. Cl.
CPC ........ *H01Q 1/28* (2013.01); *B29C 70/30* (2013.01); *B29C 70/40* (2013.01); *B29C 70/865* (2013.01); *B29C 70/885* (2013.01); *H01Q 1/287* (2013.01); *H01Q 1/38* (2013.01); *H01Q 1/40* (2013.01); *H01Q 13/106* (2013.01); *Y10T 156/1089* (2015.01)

(58) Field of Classification Search
CPC ................. H01Q 1/287; H01Q 1/28
USPC ................................. 343/705, 873
See application file for complete search history.

(56) References Cited

U.S. PATENT DOCUMENTS

| 6,496,151 | B1 * | 12/2002 | Ferreri et al. ................. 343/708 |
| 6,867,737 | B1 | 3/2005 | Ryken, Jr. et al. |
| 7,245,263 | B2 | 7/2007 | Hoshi |
| 7,275,696 | B2 * | 10/2007 | Akita et al. .................... 235/492 |
| 7,583,233 | B2 * | 9/2009 | Goldberg et al. .......... 343/792.5 |
| 7,736,958 | B2 | 6/2010 | Dozen et al. |
| 2005/0174294 | A1 | 8/2005 | Peroulis et al. |

(Continued)

FOREIGN PATENT DOCUMENTS

| DE | 102006005902 A1 | 8/2007 |
| EP | 1783859 A1 | 5/2007 |

(Continued)

OTHER PUBLICATIONS

Machine translation of FR 2665324 A1.*

(Continued)

*Primary Examiner* — Hoang V Nguyen
*Assistant Examiner* — Michael Bouizza
(74) *Attorney, Agent, or Firm* — Yee & Associates, P.C.

(57) ABSTRACT

A method and apparatus comprising a resin layer, a number of conductive elements, and a number of layers of reinforcement material. The number of conductive elements is on the resin layer. The number of conductive elements has a configuration that forms an antenna system. The number of layers of reinforcement material forms a reinforcement for a composite structure, and at least a portion of the resin layer forms a matrix for the composite structure.

20 Claims, 7 Drawing Sheets

(56) References Cited

U.S. PATENT DOCUMENTS

2008/0218416 A1* 9/2008 Handy et al. ........... 343/700 MS
2009/0079631 A1* 3/2009 Hurst et al. ................... 342/367

FOREIGN PATENT DOCUMENTS

FR        2665324 A1     1/1992
FR        2665324 A1 *  1/1992 ............... H01Q 1/28

OTHER PUBLICATIONS

EP search report dated Sep. 14, 2012 regarding application 12172319.0-2220, reference 1284P430EPCS, applicant The Boeing Company, 6 pages.

Peroulis et al., "Design of Reconfigurable Slot Antennas", IEEE Transactions on Antennas and Propagation, vol. 53, No. 2, Feb. 2005, pp. 645-655.

* cited by examiner

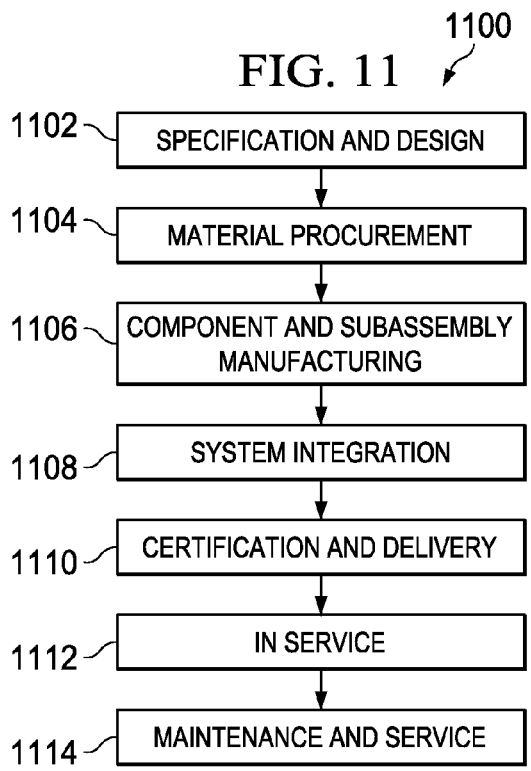
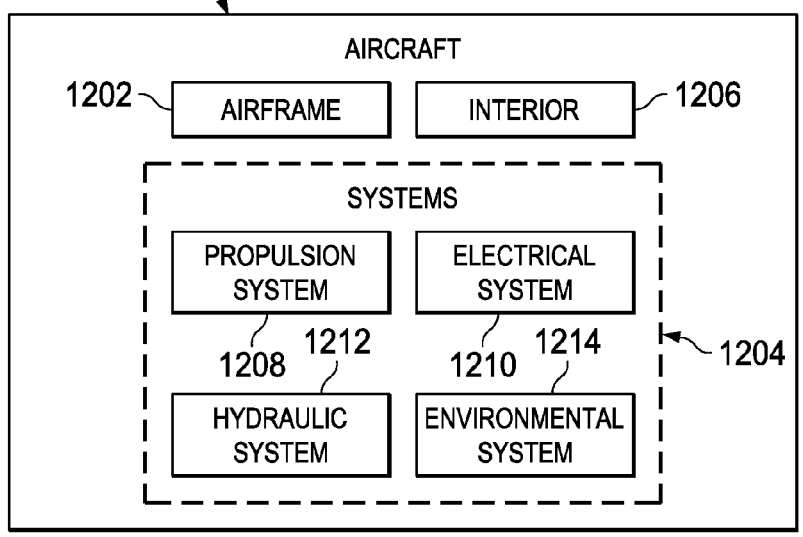

INTEGRATED ANTENNA SYSTEM

BACKGROUND INFORMATION

1. Field

The present invention relates generally to antennas and, in particular, to structurally integrated antennas. More particularly, the present disclosure relates to a method and apparatus for a slot antenna that is a composite structure or is integrated into a composite structure.

2. Background

Antennas are used in many applications to transmit and/or receive radio frequency signals. Antennas are commonly used on aircraft. For example, an antenna on an aircraft may be used to provide communication between the aircraft and another aircraft, a ground station, a satellite, and/or some suitable type of platform.

Antennas can also be used in radar systems on aircraft. When used in a radar system, antennas may aid in detecting objects, such as, for example, ground objects, maritime objects, airborne objects, and/or other suitable types of objects. Antennas used in radar systems may also support generating images, such as synthetic aperture radar images, inverse synthetic aperture radar images, and/or other suitable types of radar images. In this manner, antennas may be used in communications and remote sensing.

Different parameters are taken into account in designing antennas for aircraft. These parameters may include a desired level of performance for remote sensing and communications functions. Further, the antennas may be required to take into account the constraints of the aircraft for which these functions are performed.

Weight, size, and shape of antennas are additional examples of parameters taken into account in antenna design for aircraft. Reducing the weight of an aircraft by reducing the weight of an antenna may increase the fuel efficiency or the distance an aircraft may travel. Further, the size of the antenna may place constraints on what other components may be included in the aircraft and may place constraints on the design of the aircraft. Reducing the size of the antenna may reduce space issues in an aircraft. Also, the shape of the antenna on the aircraft may affect performance of the aircraft. For example, depending on the shape of the antenna and a required orientation for the antenna, undesired drag on the aircraft may be introduced.

With respect to unmanned aerial vehicles, ultrahigh frequency (UHF) radar systems may be mounted in pods attached to unmanned aerial vehicles (UAVs). Currently designed antennas for these radar systems may have undesired characteristics.

For example, depending on the specific implementation, pods containing antennas may be as long as about 21 feet long. The weight of these pods may reduce the time or distance that an unmanned aerial vehicle can fly. These reductions may increase as the size of the unmanned aerial vehicle decreases. Therefore, it would be advantageous to have a method and apparatus that takes into account at least some of the issues discussed above, as well as other possible issues.

SUMMARY

In one advantageous embodiment, an apparatus comprises a resin layer, a number of conductive elements, and a number of layers of reinforcement material. The number of conductive elements is on the resin layer. The number of conductive elements has a configuration that forms an antenna system. The number of layers of reinforcement material forms a reinforcement for a composite structure, and at least a portion of the resin layer forms a matrix for the composite structure.

In another advantageous embodiment, a method for operating an antenna is provided. A signal is generated in a number of conductive elements in a composite structure. The composite structure comprises a matrix formed from at least a portion of a resin layer and a reinforcement formed from a number of layers of reinforcement material. A configuration of the number of conductive elements forms an antenna system.

In yet another advantageous embodiment, a method for forming an antenna system is provided. A number of conductive elements is formed in a configuration on a resin layer. The configuration of the number of conductive elements forms an antenna system. The resin layer with the number of conductive elements is positioned with respect to a number of layers of reinforcement material. The resin layer with the number of layers of reinforcement material is consolidated to form a composite structure. The antenna system is in the composite structure.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features characteristic of the invention are set forth in the appended claims. The invention itself, however, as well as a preferred mode of use, further objectives, and advantages thereof, will best be understood by reference to the following detailed description of an advantageous embodiment of the present invention when read in conjunction with the accompanying drawings, wherein:

FIG. 11 is an illustration of an aircraft manufacturing and service method in accordance with an advantageous embodiment; and FIG. 12 is an illustration of an aircraft on which an advantageous embodiment may be implemented.

DETAILED DESCRIPTION

Figure 1:
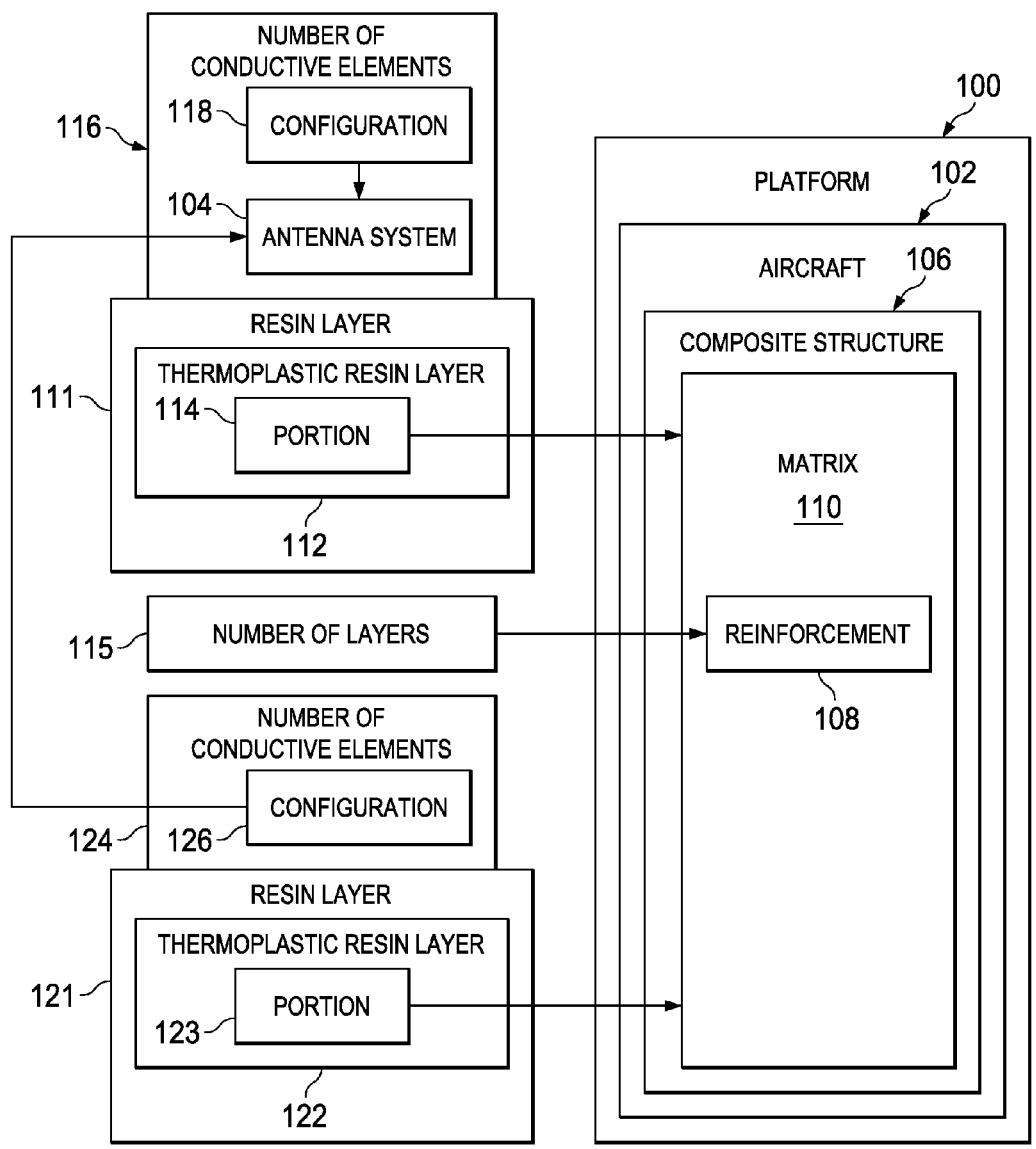
FIG. 1 is an illustration of a platform with an antenna system in which an advantageous embodiment may be implemented.

The different advantageous embodiments recognize and take into account a number of different considerations. "A number", as used herein with reference to items, means one or more items. For example, a number of considerations is one or more considerations.

The advantageous embodiments recognize and take into account that it would be desirable to reduce weight, protrusions that induce aerodynamic drag, and/or other features of an aircraft that may decrease the performance of the aircraft. For example, having the longest possible flight time or flight distance to perform a mission is desirable. As a result, reducing the drag, weight, and other constraints that may adversely affect the performance of the aircraft.

The different advantageous embodiments recognize and take into account that currently-used antenna systems and pods or other structures used to attach antenna systems to aircraft may increase undesired airflow around the aircraft. These types of systems also may increase the weight of the aircraft.

For example, with the addition of a pod to the exterior of an unmanned aerial vehicle, airflow around the aircraft during flight may have undesired characteristics. As one illustrative example, the addition of a pod to an unmanned aerial vehicle may increase drag. The different advantageous embodiments recognize and take into account that the increased weight of the unmanned aerial vehicle with the pod and the increased drag may reduce the time and/or distance that the unmanned aerial vehicle can fly.

The different advantageous embodiments recognize and take into account that manufacturing antenna systems as part of a structure of an aircraft may reduce the weight and undesired airflow in an aircraft. The different advantageous embodiments recognize and take into account that having a structure perform more than one function may reduce the number of structures in the aircraft. As a result, weight, undesired airflow, and/or other parameters that may lead to undesired performance also may be reduced.

Thus, the different advantageous embodiments provide a method and apparatus for integrating an antenna system into a structure for an air vehicle without requiring an additional structure to be added to the vehicle. In other words, the antenna system may be integrated into a part of the vehicle structure that already has a function independent of the antenna system.

The advantageous embodiments provide a method and apparatus for an antenna system that is part of a composite structure. In one advantageous embodiment, an apparatus comprises a thermoplastic resin layer, a number of conductive elements, and a number of layers of reinforcement material. The number of conductive elements is on the thermoplastic resin layer. The number of conductive elements has a configuration that forms an antenna system. The number of layers of reinforcement material forms a reinforcement for a composite structure, and at least a portion of the thermoplastic resin layer forms a matrix for the composite structure.

With reference to the figures and, in particular, with reference to FIG. 1, an illustration of a platform with an antenna system is depicted in accordance with an advantageous embodiment. In this illustrative example, platform 100 may take the form of aircraft 102. In these illustrative examples, antenna system 104 is part of composite structure 106. Composite structure 106 is associated with platform 100.

Platform 100 may be one of a mobile platform, a stationary platform, a land-based structure, an aquatic-based structure, a space-based structure, an aircraft, an unmanned aerial vehicle, a surface of a ship, a tank, a personnel carrier, a train, a spacecraft, a space station, a satellite, a submarine, an automobile, a power plant, a bridge, a dam, a manufacturing facility, a building, and/or other suitable types of platforms.

A first component, such as composite structure 106, may be considered to be associated with a second component, such as platform 100, in a number of different ways. For example, the first component may be consolidated with the second component, bonded to the second component, welded to the second component, cured with the second component, fastened to the second component, and/or connected to the second component in some other suitable manner. The first component also may be connected to the second component using a third component. The first component may also be associated with the second component by being formed as part of and/or an extension of the second component.

When platform 100 takes the form of composite structure 106, the result may be, for example, without limitation, a wing, an aileron, a horizontal stabilizer, a vertical stabilizer, an engine housing, a flap, a fuselage, or some other suitable type of composite structure for the aircraft. In this manner, antenna system 104 may be integrated with composite structure 106 already having a function or purpose for platform 100 in addition to being a structure for antenna system 104.

As a result, a separate structure for only holding antenna system 104 may not be needed for platform 100. Of course, in other illustrative examples, composite structure 106 may function solely to hold antenna system 104.

In these illustrative examples, composite structure 106 is a multi-layered composite structure. The layers of composite structure 106 comprise reinforcement 108 and matrix 110. Matrix 110 surrounds reinforcement 108 to provide support for reinforcement 108. In these illustrative examples, matrix 110 may be formed using resin layer 111, while reinforcement 108 may be formed using number of layers 115. In these illustrative examples, resin layer 111 takes the form of thermoplastic resin layer 112.

In particular, thermoplastic resin layer 112 and number of layers 115 may be consolidated to form composite structure 106. Consolidation of two or more layers comprises melding the layers. For example, thermoplastic resin layer 112 and number of layers 115 may be melded together to form composite structure 106. The consolidation may occur, for example, through curing, applying heat, and/or applying pressure.

In particular, heat and/or pressure may be applied to soften thermoplastic resin layer 112 and allow the thermoplastic resin in thermoplastic resin layer 112 to flow into and/or infuse with number of layers 115. Thereafter, these materials may be cooled and hardened to form composite structure 106.

Thermoplastic resin layer 112 is comprised of material that may soften when heated and harden when cooled. Thermoplastic resin layer 112 can be softened and hardened during the forming of composite structure 106 any number of times.

In these illustrative examples, the consolidation of thermoplastic resin layer 112 and number of layers 115 may be performed using heat and/or pressure. In particular, at least portion 114 of thermoplastic resin layer 112 may form at least a part of matrix 110 for composite structure 106, and number of layers 115 may form reinforcement 108 for composite structure 106 after thermoplastic resin layer 112 and number of layers 115 is consolidated together. In some illustrative examples, reinforcement 108 may be pre-infused with matrix 110 prior to consolidation.

In these illustrative examples, the thermoplastic resin in thermoplastic resin layer 112 may be comprised of a material selected from at least one of a polyether ketone, a polyolefin, a polyamide, and other suitable types of materials. Polyether ketones may include, for example, various polyethers and polyketone analogs. Polyolefins may include, for example, polypropylene, polyurethane, polyesters, and other types of polyolefins.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Number of layers 115 may comprise reinforcement materials and/or additive materials that form reinforcement 108 for composite structure 106. When more than one layer is present in number of layers 115, these layers may have the same orientation or different orientations, depending on the particular implementation.

The reinforcement materials and additive materials in number of layers 115 may include, for example, without limitation, at least one of fiberglass, carbon, graphite, and other suitable materials. These materials may take the form of, for example, particulates, discontinuous fibers, non-woven fibers, cloth, tapes, woven fibers, whiskers, and/or other suitable forms for materials.

Prior to consolidation being performed to form composite structure 106, thermoplastic resin layer 112 may be located on or under one of number of layers 115 or between two of number of layers 115. After thermoplastic resin layer 112 and number of layers 115 are consolidated to form composite structure 106, at least portion 114 of thermoplastic resin layer 112 may become co-located with one or more of number of layers 115.

In other words, a portion of thermoplastic resin layer 112 and one or more of number of layers 115 may form the same layer in composite structure 106. In some illustrative examples, various portions of thermoplastic resin layer 112 may be co-located with various portions of number of layers 115.

In these illustrative examples, number of conductive elements 116 may be on thermoplastic resin layer 112. As one illustrative example, number of conductive elements 116 may be formed on and/or within thermoplastic resin layer 112 prior to the consolidation process. For example, number of conductive elements 116 may be deposited on thermoplastic resin layer 112 prior to the consolidation process. In particular, number of conductive elements 116 may be deposited on thermoplastic resin layer 112 in the form of configuration 118.

As another illustrative example, number of conductive elements 116 may be on thermoplastic resin layer 112 after the consolidation of thermoplastic resin layer 112 and number of layers 115. For example, number of conductive elements 116 may be formed on one of number of layers 115. Further, thermoplastic resin layer 112 may be placed over this layer and number of conductive elements 116 formed on this layer.

The consolidation of thermoplastic resin layer 112 and number of layers 115 may cause thermoplastic resin layer 112 to flow into number of layers 115. In this example, after consolidation, number of conductive elements 116 remains in configuration 118 on a portion of thermoplastic resin layer 112 and/or on a portion of the layer in number of layers 115 on which number of conductive elements 116 was formed. In particular, number of conductive elements 116 may be on a portion of thermoplastic resin layer 112 that is below number of conductive elements 116 after consolidation of thermoplastic resin layer 112 and number of layers 115.

As yet another illustrative example, thermoplastic resin layer 112 may be pre-infused into number of layers 115 to form a pre-consolidated laminate. Number of conductive elements 116 may then be formed on the pre-consolidated laminate. Further, the pre-consolidated laminate, formed by thermoplastic resin layer 112 and number of layers 115, may then be consolidated with number of conductive elements 116 on the pre-consolidated laminate.

As depicted, number of conductive elements 116 in configuration 118 forms antenna system 104. Number of conductive elements 116 may be a first number of conductive elements for forming antenna system 104 in this illustrative example. Number of conductive elements 116 may comprise components for antenna system 104, such as, for example, without limitation, at least one of an antenna, a control line, a radio frequency transmission line, a conductive radio frequency transmission line, a conductive trace, a capacitor, a switch, a resistor, an inductor, and other suitable components for antenna system 104.

The materials in number of layers 115 may be selected such that reinforcement 108 does not interfere with and/or have undesired effects on the operation of antenna system 104 formed by number of conductive elements 116. In other words, the materials in number of layers 115 are selected such that the materials do not reduce the capability of number of conductive elements 116 to provide a desired functionality for antenna system 104.

Additionally, in some illustrative examples, an additional layer, resin layer 121, may also be part of composite structure 106. In this depicted example, resin layer 121 takes the form of thermoplastic resin layer 122. Thermoplastic resin layer 122 is another layer in addition to thermoplastic resin layer 112. Thermoplastic resin layer 122 also may be co-located with number of layers 115 of reinforcement 108 after consolidation.

At least portion 123 of thermoplastic resin layer 122 also may be part of matrix 110 for reinforcement 108. Number of conductive elements 124 may be present on thermoplastic resin layer 122 in configuration 126. Number of conductive elements 124 in configuration 126 may form at least a portion of antenna system 104. Number of conductive elements 124 may be a second number of conductive elements for forming antenna system 104.

For example, when in configuration 126, number of conductive elements 124 may form a number of components for an antenna in antenna system 104, while number of conductive elements 116 in configuration 118 may form a number of components for the same antenna in antenna system 104. In other illustrative examples, number of conductive elements 116 in configuration 118 may form one antenna in antenna system 104, while number of conductive elements 124 in configuration 126 may form another antenna in antenna system 104. In this manner, antenna system 104 may comprise multiple antennas.

In these illustrative examples, thermoplastic resin layer 112, thermoplastic resin layer 122, and number of layers 115 may be arranged in any order prior to consolidation. After consolidation, various portions of thermoplastic resin layer 112, thermoplastic resin layer 122, and number of layers 115 may be co-located with each other in the different layers of composite structure 106.

In some cases, the order of thermoplastic resin layer 112, thermoplastic resin layer 122, and number of layers 115 may be selected to provide a desired function for composite structure 106. In these illustrative examples, configuration 118 for number of conductive elements 116 and configuration 126 for number of conductive elements 124 may be maintained even after consolidation.

Once the different layers for forming matrix 110 and reinforcement 108 have been consolidated, composite structure 106 may be shaped into a desired shape. For example, if composite structure 106 is a structure for a wing of aircraft 102, composite structure 106 may be shaped to have the desired shape for the structure for the wing.

This shaping may be performed due to the material of thermoplastic resin layer 112 and thermoplastic resin layer 122 being able to be softened and hardened multiple times without causing undesired effects on composite structure 106. In this manner, composite structure 106 may be reshaped any number of times to achieve the desired shape for composite structure 106.

In these illustrative examples, antenna system 104 may be operated by generating and/or propagating a signal in one or more of number of conductive elements 116 and/or one or more of number of conductive elements 124 in composite structure 106. This signal may be generated and/or propagated when an electromagnetic signal is received by antenna system 104. Further, the signal also may be generated within antenna system 104, depending on the implementation.

The illustration of platform 100 and antenna system 104 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, thermoplastic resin layer 112 may be placed on a layer in number of layers 115 comprising more than one material. For example, the layer may be materials that have already been consolidated and/or cured together. This composite structure, along with thermoplastic resin layer 112 and number of layers 115, may then be consolidated and/or cured together to form composite structure 106.

In some illustrative examples, number of conductive elements 116, number of conductive elements 124, and/or other conductive elements deposited onto other thermoplastic resin layers, in addition to thermoplastic resin layer 112 and thermoplastic resin layer 122, may form multiple antennas for one or more antenna systems.

Further, in other illustrative examples, number of conductive elements 116 and/or number of conductive elements 124 may be deposited onto a surface of composite structure 106 after composite structure 106 has been formed. Composite structure 106 may then be reheated and/or reshaped such that number of conductive elements 116 is on at least a portion of the thermoplastic resin from thermoplastic resin layer 112 and/or thermoplastic resin layer 122.

As yet another illustrative example, another type of resin layer may be used in place of one or more of thermoplastic resin layer 112 and thermoplastic resin layer 122. For example the resin layer may be comprised of a thermoset resin or some other suitable type of resin.

Further, in some illustrative examples, composite structure 106 may be a composite laminate comprised of any number of layers such as, for example, a layer of reinforcement material, a thermoplastic resin layer, a thermoset resin layer, a layer of plastic material, a layer of composite material, a resin layer, or some other suitable type of layer.

Figure 2:
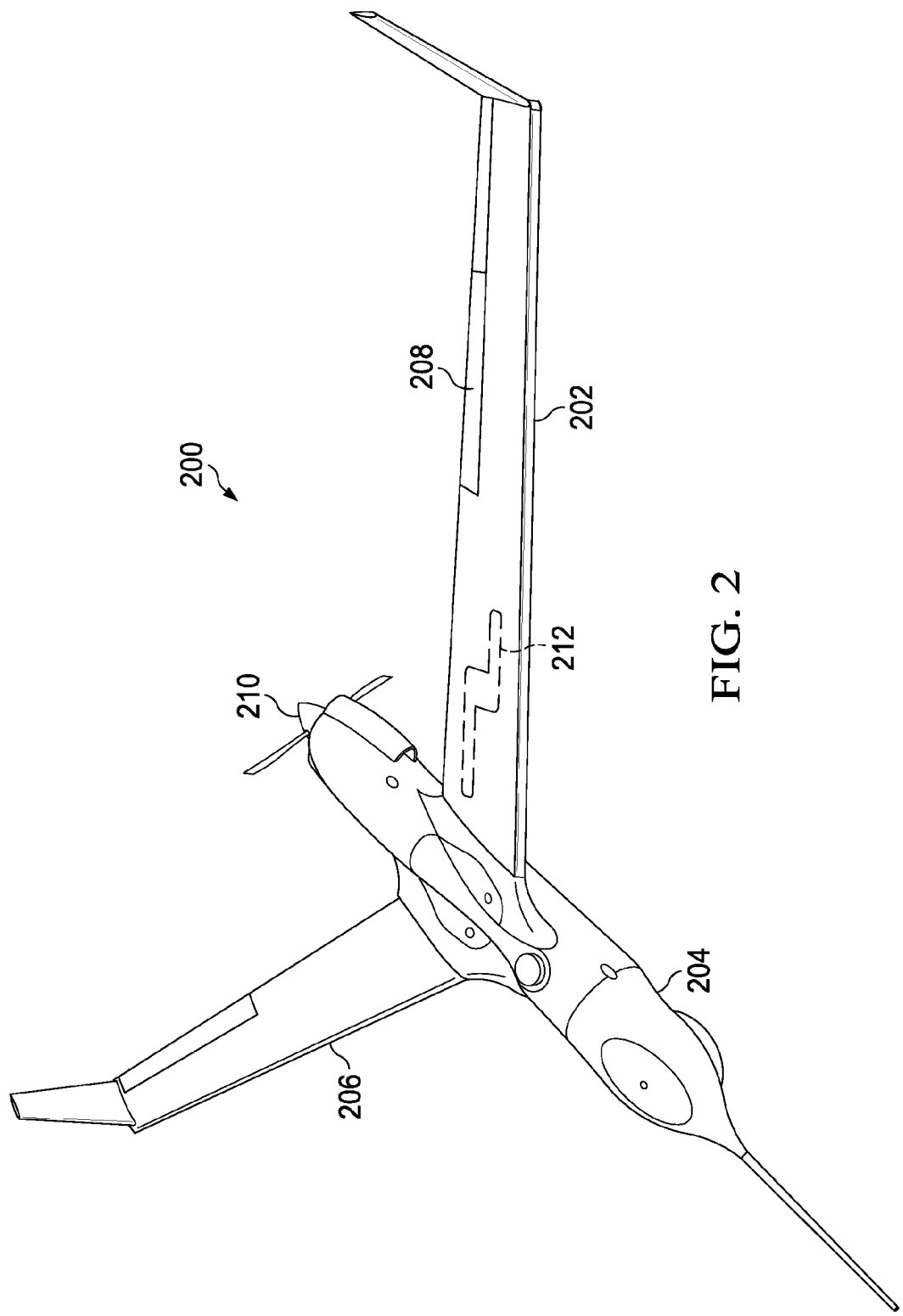
FIG. 2 is an illustration of an aircraft in accordance with an advantageous embodiment.

With reference to FIG. 2, an illustration of an aircraft is depicted in accordance with an advantageous embodiment. Aircraft 200 is an example of a physical implementation for aircraft 102 shown in block form in FIG. 1.

In this illustrative example, aircraft 200 is unmanned aerial vehicle 202. Aircraft 200 has fuselage 204. Wing 206 and wing 208 are attached to fuselage 204. Engine 210 provides propulsion for aircraft 200. In this illustrative example, antenna system 212 is integrated as part of the structure for wing 208.

With the integration of antenna system 212 as part of the structure for wing 208, a separate structure and/or pod for antenna system 212 is unnecessary. In this manner, the structure of wing 208 having antenna system 212 becomes a multifunctional component of aircraft 200.

Further, the weight contributed by additional structures needed for an external antenna or pod may be reduced and/or eliminated. Thus, aircraft 200 may have a longer range and/or longer flying time than other aircraft that use a separate pod-based antenna system.

This illustration of aircraft 200 is only meant as one example of a physical implementation for aircraft 102 and antenna system 104 within aircraft 102 and is not meant to limit the manner in which other implementations of aircraft 102 and antenna system 104 within aircraft 102 shown in block form in FIG. 1 may occur.

For example, in other illustrative examples, antenna system 212 may be integrated as part of a structure for fuselage 204 instead of wing 208. In other illustrative examples, an additional number of antenna systems may be present in addition to antenna system 212. Further, in other illustrative examples, antenna system 212 may be used in a rotorcraft or manned aircraft.

Figure 3:
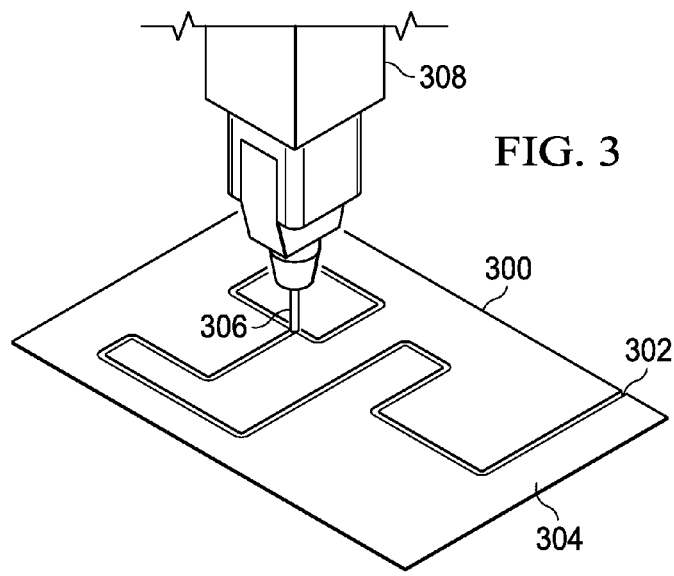
FIG. 3 is an illustration of the formation of conductive elements on a thermoplastic resin layer in accordance with an advantageous embodiment.

With reference to FIGS. 3-7, illustrations of a process flow for forming an antenna system in a composite structure are depicted in accordance with an advantageous embodiment. With reference first to FIG. 3, an illustration of the formation of conductive elements on a thermoplastic resin layer is depicted in accordance with an advantageous embodiment.

In this illustrative example, thermoplastic resin layer 300 is an example of one implementation for resin layer 111 in FIG. 1 and in particular, thermoplastic resin layer 112 in FIG. 1. In this depicted example, thermoplastic resin layer 300 is comprised of polyether ether ketone (PEEK). Thermoplastic resin layer 300 may have a thickness of about 0.5 millimeters to about 15 millimeters in this example.

Of course, thermoplastic resin layer 300 may have different thicknesses, depending on the implementation. Further, the width and the length of thermoplastic resin layer 300 may vary, depending on the composite structure in which thermoplastic resin layer 300 is used.

As depicted, conductive elements 302 may be formed on and/or within thermoplastic resin layer 300. In particular, in this illustrative example, conductive elements 302 may be deposited directly onto surface 304 of thermoplastic resin layer 300.

Conductive elements 302 may be formed on surface 304 using any number of techniques for depositing conductive elements 302 onto a surface. These techniques may include, for example, without limitation, silk screening, electroplating, chemical deposition, spraying, plasma spraying, chemical vapor deposition, physical vapor deposition, and/or other suitable techniques.

Further, in some illustrative examples, conductive elements 302 may be formed by applying conductive tape to surface 304 of thermoplastic resin layer 112. For example, conductive elements 302 may be copper wires that are placed by hand or by machine onto surface 304.

In this illustrative example, plasma spray processing is used. Conductive material 306 is sprayed onto surface 304 of thermoplastic resin layer 300 using plasma sprayer 308.

In plasma spray processing, the material for conductive elements 302 is mixed or injected into a plasma that is directed onto thermoplastic resin layer 300. Mesoplasma spraying may be an example of one type of plasma spraying that may be used.

Further, in these illustrative examples, the formation of conductive elements 302 on thermoplastic resin layer 300 is performed when thermoplastic resin layer 300 has a substantially planar shape. Although conductive elements 302 may be formed when thermoplastic resin layer 300 has an initially non-planar topology, this process may require increased effort, cost, and process time.

In these illustrative examples, thermoplastic resin layer 300 may be specifically selected instead of a thermoset resin layer. With the use of thermoplastic resin layer 300, this layer and the reinforcement used with this layer may be reshaped multiple times to attain the desired shape.

Figure 4:
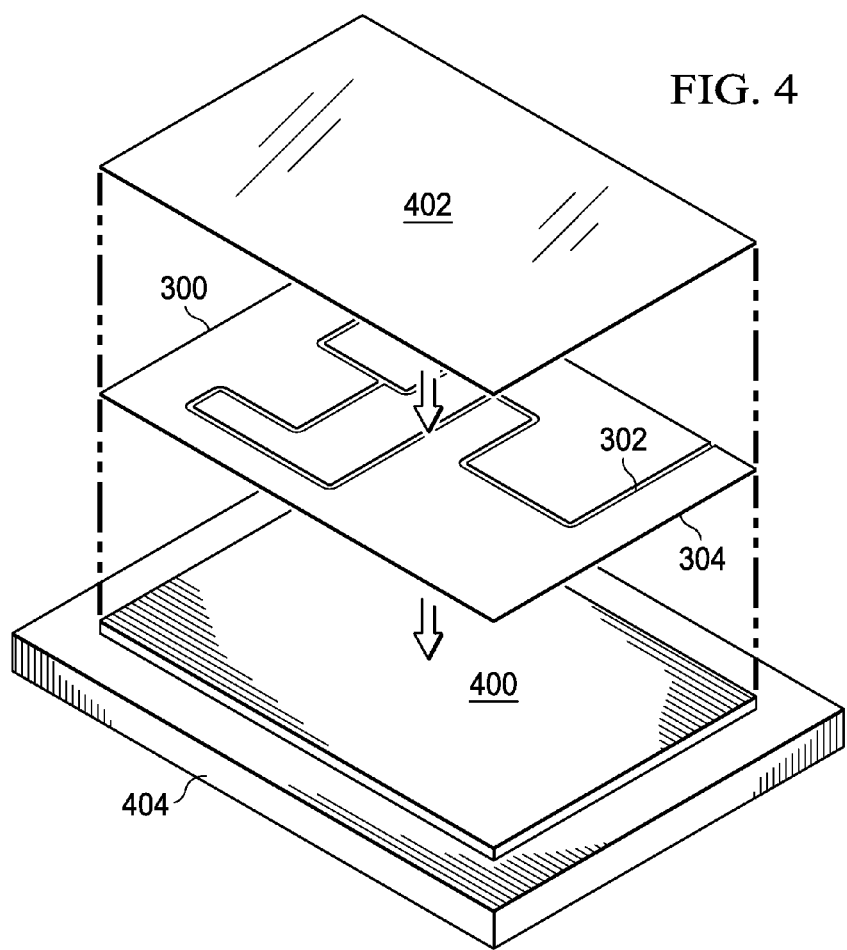
FIG. 4 is an illustration of a position of a thermoplastic resin layer on a layer of reinforcement in accordance with an advantageous embodiment.

With reference to FIG. 4, an illustration of a positioning of a thermoplastic resin layer on a layer of reinforcement is depicted in accordance with an advantageous embodiment. In this illustrative example, thermoplastic resin layer 300 with conductive elements 302 is placed onto composite layer 400. Composite layer 400 is an example of a layer in number of layers 115 for reinforcement 108 in FIG. 1.

In this illustrative example, composite layer 400 may comprise a number of layers. Further, this number of layers may have already been consolidated in this depicted example. For example, composite layer 400 may include at least one of a fiberglass layer, a reinforcement layer, a thermoplastic resin layer, a thermoset resin layer, and other suitable types of layers that have been consolidated.

Of course, in other illustrative examples, composite layer 400 may be a stack of layers that have not yet been consolidated. In some illustrative examples, composite layer 400 may be a top layer or a surface of a composite structure.

As depicted, layer of reinforcement material 402 also may be placed over thermoplastic resin layer 300. Layer of reinforcement material 402 is placed over thermoplastic resin layer 300 in addition to the layers already incorporated into composite layer 400. Layer of reinforcement material 402 may be made of the same or different materials as composite layer 400, depending on the particular desired properties of the final composite structure to be formed.

Additional layers also may be placed over thermoplastic resin layer 300. In some cases, a number of additional thermoplastic resin layers with or without conductive elements may be placed over thermoplastic resin layer 300 and/or layer of reinforcement material 402. In other illustrative examples, a number of additional thermoplastic resin layers may be located within composite layer 400.

Composite layer 400 may contain any number of layers that can provide support and maintain the configuration of conductive elements 302 after composite layer 400, thermoplastic resin layer 300, and layer of reinforcement material 402 have been consolidated together.

In other illustrative examples, platform 404 may be used to maintain a substantially planar shape for composite layer 400, thermoplastic resin layer 300, and layer of reinforcement material 402 during the consolidation process.

Figure 5:
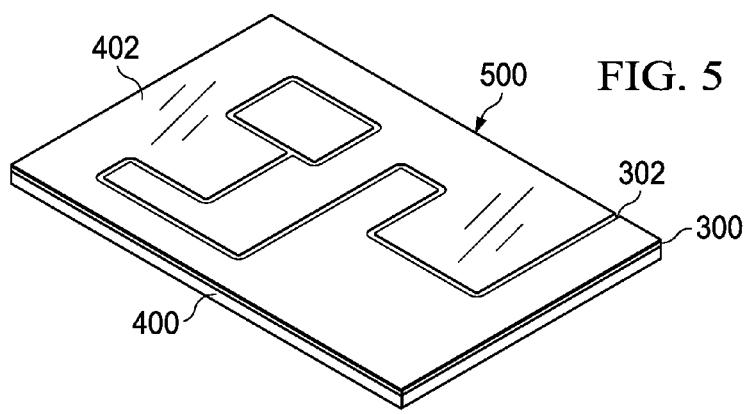
FIG. 5 is an illustration of a laminate formed from a thermoplastic resin layer and layers of reinforcement materials in accordance with an advantageous embodiment.

With reference to FIG. 5, an illustration of a laminate formed from a thermoplastic resin layer, a composite layer, and a layer of reinforcement material is depicted in accordance with an advantageous embodiment. In this illustrative example, composite layer 400, thermoplastic resin layer 300, and layer of reinforcement material 402 have been consolidated. In particular, these layers have been consolidated to form laminate 500. Consolidating these layers may include applying heat and/or pressure. For example, the consolidation may be performed using a press, an autoclave, or some other suitable device.

At least a portion of the thermoplastic resin in thermoplastic resin layer 300 may flow into at least one of composite layer 400 and layer of reinforcement material 402 to form laminate 500. As depicted, laminate 500 has a substantially planar shape in this example. Laminate 500 is an example of one implementation for composite structure 106 in FIG. 1 prior to composite structure 106 being shaped into a desired shape for platform 100 in FIG. 1.

Conductive elements 302, in these illustrative examples, maintain a desired configuration for an antenna system throughout the process of consolidation these layers. In other words, the configuration of conductive elements 302 as deposited onto surface 304 of thermoplastic resin layer 300 in FIG. 3 does not substantially change during the process of consolidating composite layer 400, thermoplastic resin layer 300, and layer of reinforcement material 402. Further, after consolidation of these layers into laminate 500 having a substantially planar shape, the thermoplastic resin from thermoplastic resin layer 300 may be fully hardened within laminate 500.

Figure 6:
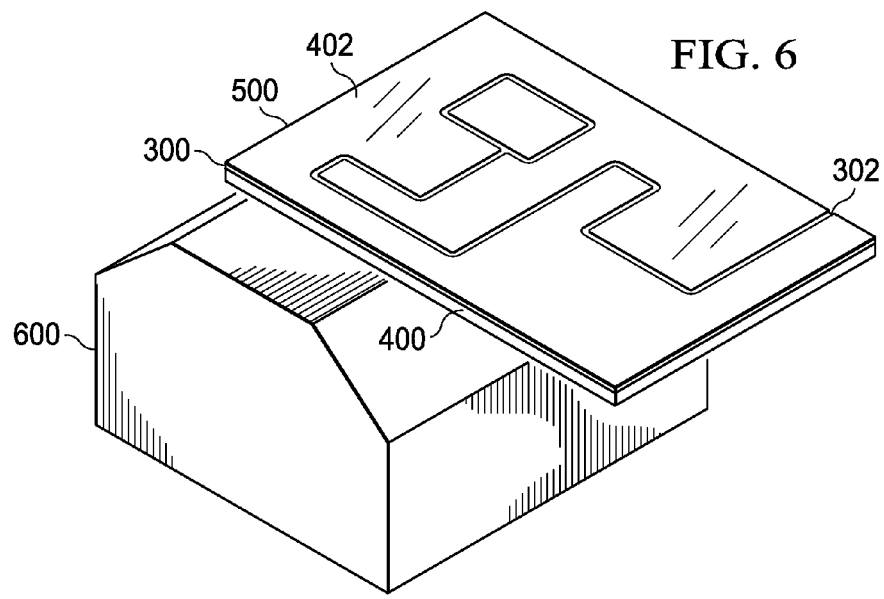
FIG. 6 is an illustration of laminate as positioned with respect to a mold in accordance with an advantageous embodiment.

With reference to FIG. 6, laminate 500 is positioned with respect to mold 600. Mold 600 may be used to change the substantially planar shape of laminate 500 to a desired shape for a final composite structure. In this illustrative example, mold 600 is an outer-line mold on which laminate 500 is placed. In other illustrative examples, mold 600 may be, for example, without limitation, some other suitable type of mold, a die, and/or some other suitable type of device for changing the shape of laminate 500 to a desired shape.

Heat and/or pressure may be applied to laminate 500 to change the shape of laminate 500 to conform to a shape for mold 600. The heat and/or pressure applied to laminate 500 causes the thermoplastic resin from thermoplastic resin layer 300 to again become malleable such that laminate 500 may be shaped. In this manner, the substantially planar shape for laminate 500 may be changed to the desired shape for the final composite structure.

In some cases, heat and/or pressure may be applied to laminate 500 to form the desired shape for the final composite structure as part of a separate consolidation step. This separate consolidation step may be, for example, the addition of layers to laminate 500, the joining of laminate 500 with some other part comprising thermoplastic resin, and/or some other suitable type of operation.

In some illustrative examples, shape memory alloys may be used to shape laminate 500 into the final composite structure. These shape memory alloys may include metal shape memory alloys and/or plastic shape memory alloys.

Figure 7:
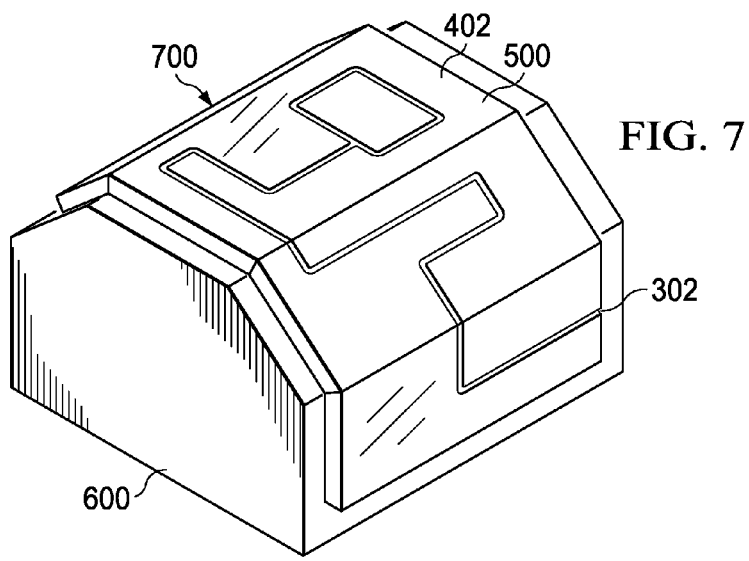
FIG. 7 is an illustration of a composite structure with a desired shape in accordance with an advantageous embodiment.

With reference to FIG. 7, an illustration of a composite structure with a desired shape is depicted in accordance with an advantageous embodiment. In this illustrative example, heat and/or pressure have been applied to laminate 500 to shape laminate 500 into desired shape 700 for a final composite structure.

After laminate 500 has been shaped to have desired shape 700, laminate 500 with desired shape 700 may be cooled such that the thermoplastic resin from thermoplastic resin layer 300 in laminate 500 in FIG. 6 fully hardens. In this manner, desired shape 700 may be maintained after laminate 500 is removed from mold 600.

This process of applying heat and/or pressure and then cooling laminate 500 to change the shape of laminate 500 may be performed any number of times to achieve desired shape 700 or some other suitable shape. Desired shape 700 may be selected to provide a desired functionality for an antenna system comprising conductive elements 302. With the use of thermoplastic resin layer 300, laminate 500 may be reshaped any number of times using heat and/or pressure to reconfigure conductive elements 302 such that conductive elements 302 form an antenna system with the desired functionality.

The different operations illustrated in the process flow depicted in FIGS. 3-7 are only some of the processes that may occur. These examples illustrate operations for purposes of depicting a process flow that may achieve a desired functionality for a particular antenna system in a composite structure. Other processes also may be included but not shown.

For example, in some illustrative examples, the process of applying heat and/or pressure and then cooling may be used to consolidate a number of laminates comprising thermoplastic resin. In this manner, the final composite structure may comprise multiple laminates, such as laminate 500, that have been consolidated together.

Further, finishing steps, painting, inspection, and other operations are not depicted and may be included in forming the final composite structure having desired shape 700.

Figure 8:
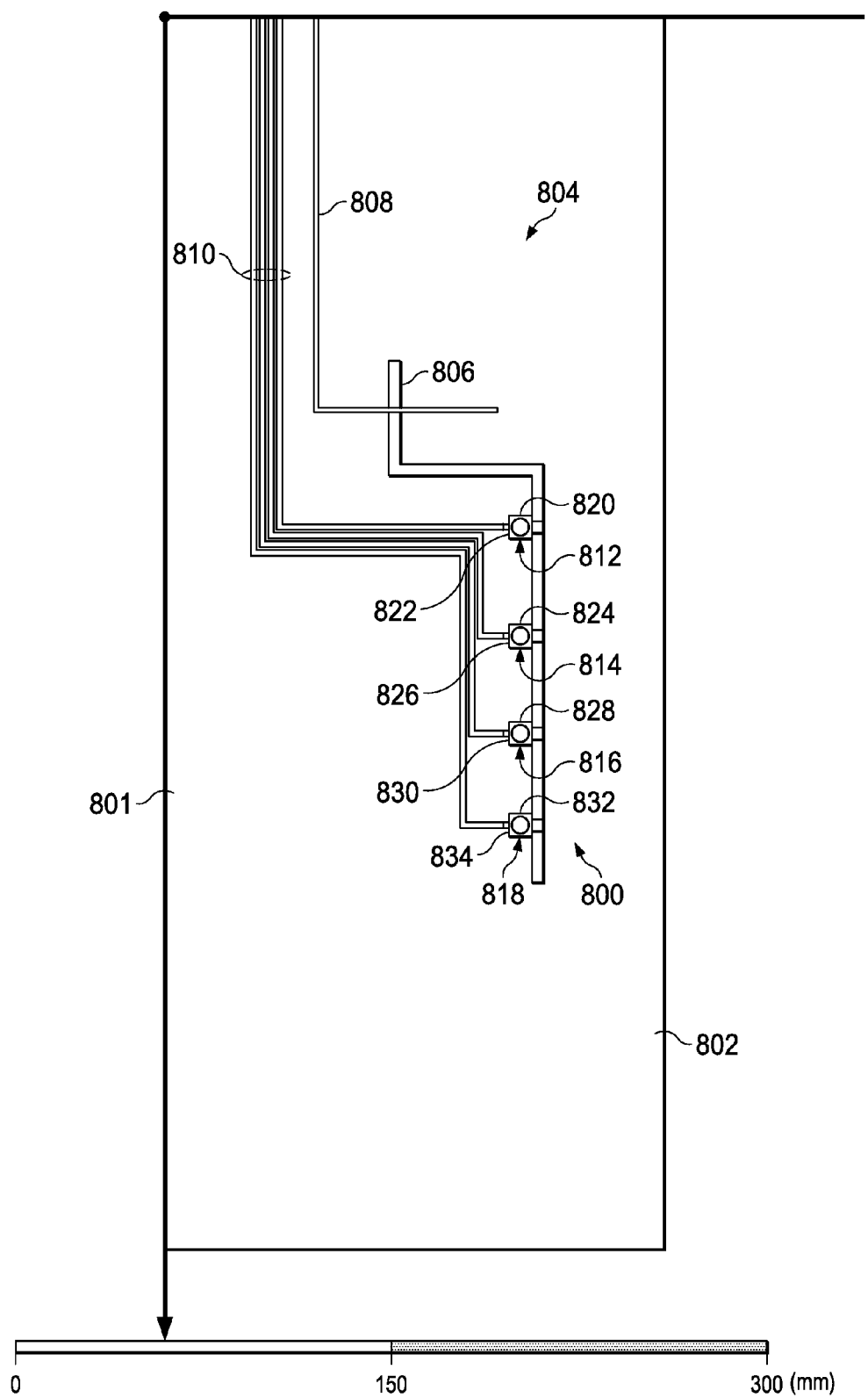
FIG. 8 is an illustration of conductive elements on a thermoplastic resin layer in accordance with an advantageous embodiment.

With reference to FIG. 8, an illustration of conductive elements on a thermoplastic resin layer is depicted in accordance with an advantageous embodiment. In this illustrative example, conductive elements 800 are located on portion 801 of thermoplastic resin layer 802. Conductive elements 800 are examples of number of conductive elements 116 in FIG. 1. Thermoplastic resin layer 802 is an example of a physical implementation for thermoplastic resin layer 112 in FIG. 1.

In this illustrative example, conductive elements 800 have a configuration that forms antenna system 804. In this illustrative example, antenna system 804 may comprise a slot antenna system.

As depicted, conductive elements 800 comprise antenna 806, antenna feed line 808, switch control lines 810, switch 812, switch 814, switch 816, switch 818, capacitor 820, capacitor 822, capacitor 824, capacitor 826, capacitor 828, capacitor 830, capacitor 832, and capacitor 834.

Further, portion 801 does not include the entire length and width of thermoplastic resin layer 802 in this depicted example. Other portions of thermoplastic resin layer 802 that may or may not include conductive elements are not shown in this illustrative example.

Figure 9:
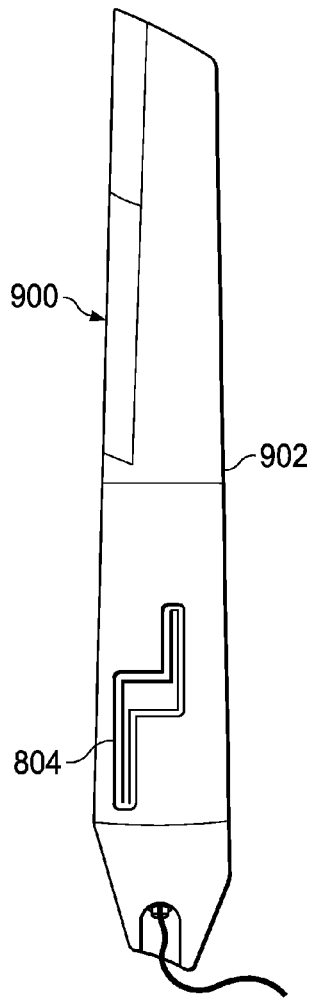
FIG. 9 is an illustration of a composite structure in accordance with an advantageous embodiment.

With reference to FIG. 9, an illustration of a composite structure is depicted in accordance with an advantageous embodiment. Composite structure 900 is an example of the final composite structure that may be formed using the process flow illustrated in FIGS. 3-7 and thermoplastic resin layer 802 from FIG. 8. In particular, portion 801 of thermoplastic resin layer 802 with conductive elements 800 for antenna system 804 illustrated in FIG. 8 may be processed as discussed above in FIGS. 3-7 to form composite structure 900.

Composite structure 900 takes the form of wing 902 in which conductive elements 800 in FIG. 8 form antenna system 804 within wing 902. Wing 902 is an example of a wing that may be used in, for example, unmanned aerial vehicle 202 in FIG. 2.

Further, the illustration of the process flow in FIGS. 3-7 to form composite structure 900 in FIG. 9 is not meant to imply limitations to the manner in which such a process may be implemented in an advantageous embodiment. For example, other types of resin layers may be used in addition to, and/or in place of, thermoplastic resin layer 300. For example, without limitation, a thermoset resin layer may be used in some illustrative examples.

The thermoset resin in the thermoset resin layer is a polymer material that irreversibly cures. In other words, the thermoset resin layer may be heated and then shaped into a final hardened shape using a consolidation process, such as curing. When fully hardened, the thermoset resin layer may not be reheated to make the thermoset resin malleable and then reshaped.

As a result, when a thermoset resin layer is used, the thermoset resin may be heated without fully curing the thermoset resin such that the thermoset resin remains in a form that can be shaped within laminate 500. In other words, the thermoset resin is heated such that laminate 500 may be malleable and be molded into a final shape.

In this manner, the thermoset resin may be heated to soften the thermoset resin and allow laminate 500 to be shaped from the substantially planar shape for laminate 500 in FIG. 5 to desired shape 700 in FIG. 7. When laminate 500 is shaped into desired shape 700 for a final composite structure, laminate 500 may then be fully consolidated such that desired shape 700 may be maintained after laminate 500 is fully consolidated and removed from mold 600.

As yet another example, conductive elements 302 may be formed on other layers in addition to, and/or in place of, thermoplastic resin layer 300. For example, conductive elements 302 may be formed on at least one of thermoplastic resin layer 300 and composite layer 400. In other words, conductive elements 302 may be formed on thermoplastic resin layer 300, composite layer 400, or both.

As a result, an apparatus may comprise a resin layer, a number of layers of reinforcement material, and a number of conductive elements on at least one of the resin layer and the number of layers of reinforcement material. The reinforcement material from the number of layers of reinforcement material forms a reinforcement for a composite structure and at least a portion of the thermoplastic resin from the thermoplastic resin layer forms a matrix for the composite structure. In this example, the number of conductive elements has a configuration that forms an antenna system, such as antenna system 804 in FIG. 8.

The different components shown in FIGS. 2-9 may be combined with the components in block form in FIG. 2, used with the components in FIG. 2, or a combination of the two. Additionally, some of the components shown in these figures may be illustrative to how components depicted in block form in FIG. 2 may be implemented as physical structures.

Figure 10:
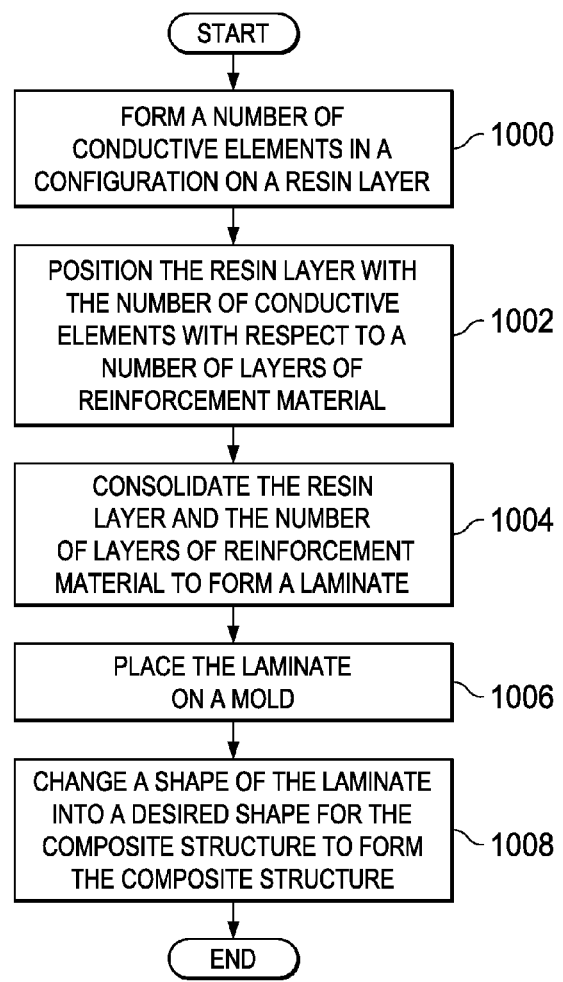
FIG. 10 is an illustration of a flowchart of a process for forming an antenna system in accordance with an advantageous embodiment.

With reference now to FIG. 10, an illustration of a flowchart of a process for forming an antenna system in a composite structure is depicted in accordance with an advantageous embodiment. The process illustrated in FIG. 10 may be implemented to form an antenna system such as, for example, antenna system 104 in FIG. 1.

The process begins by forming a number of conductive elements in a configuration on a resin layer (operation 1000). In this illustrative example, the resin layer is a thermoplastic resin layer. The configuration of the conductive elements forms an antenna system in these examples. The resin layer with the number of conductive elements is positioned with respect to a number of layers of reinforcement material (operation 1002).

Thereafter, the process consolidates the resin layer and the number of layers of reinforcement material to form a laminate (operation 1004). Operation 1004 may be performed by applying heat and/or pressure to the thermoplastic resin layer and the number of layers of reinforcement material when these layers are positioned with respect to each other. The heat may allow these layers to meld together.

Further, in operation 1004, when the resin layer is a thermoplastic resin layer, these layers may be cooled such that the thermoplastic resin layer hardens to form the laminate. The laminate may have a substantially planar shape in this illustrated example. This substantially planar shape is not a desired shape for the final composite structure to be formed.

The process then places the laminate on a mold having a desired shape for the composite structure to be formed (operation 1006). Next, the process changes a shape of the laminate into a desired shape for the composite structure to form the composite structure (operation 1008), with the process terminating thereafter. In some illustrative examples, operation 1008 may be performed using a curing process.

In this illustrative example, the use of a thermoplastic resin layer allows the shape of the laminate and/or composite structure to be changed any number of times.

The flowchart and block diagrams in the different depicted embodiments illustrate the architecture, functionality, and operation of some possible implementations of apparatuses and methods in an advantageous embodiment. In this regard, each block in the flowchart or block diagrams may represent a module, segment, function, and/or a portion of an operation or step.

In some alternative implementations of an advantageous embodiment, the function or functions noted in a block may occur out of the order illustrated in the figures. For example, in some cases, two blocks shown in succession may be executed substantially concurrently, or the blocks sometimes may be performed in the reverse order, depending on the functionality involved. Also, other blocks may be added in addition to the illustrated blocks in a flowchart or block diagram.

For example, in some illustrative examples, additional thermoplastic resin layers may be placed with respect to the number of layers of reinforcement. As another illustrative example, if a thermoset resin layer is used instead of a thermoplastic resin layer, the thermoset resin layer may not be cooled such that the thermoset resin layer fully hardens. Instead, the thermoset resin layer may be allowed to partially harden when forming the laminate. In this manner, the thermoset resin in the laminate from the thermoset resin layer may still be sufficiently malleable to allow for reshaping of the laminate from a substantially planar shape to a desired shape in operation 1008.

Referring now to FIGS. 11 and 12, embodiments of the disclosure may be described in the context of aircraft manufacturing and service method 1100 as shown in FIG. 11 and aircraft 1200 as shown in FIG. 12. Turning to FIG. 11, an illustration of an aircraft manufacturing and service method is depicted in accordance with an advantageous embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an advantageous embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1100 in FIG. 11.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, a number of apparatus embodiments, method embodiments, or a combination thereof may be utilized during production stages, such as component and subassembly manufacturing 1106 and system integration 1108 in FIG. 11.

A number of apparatus embodiments, method embodiments, or a combination thereof may be utilized while aircraft 1200 is in service 1112 and/or during maintenance and service 1114 in FIG. 11. The use of a number of the different advantageous embodiments may substantially expedite the assembly of and/or reduce the cost of aircraft 1200.

Thus, the different advantageous embodiments provide a method and apparatus for integrating an antenna system into a structure for an air vehicle without requiring an additional structure to be added to the vehicle. In this manner, the antenna system may be integrated into a part of the air vehicle structure that already has a function independent of the antenna system.

In one advantageous embodiment, an apparatus comprises a thermoplastic resin layer, a number of conductive elements, and a number of layers of reinforcement material. The number of conductive elements is on the thermoplastic resin layer. The number of conductive elements has a configuration that forms an antenna system. The number of layers of reinforcement material forms a reinforcement for a composite structure, and at least a portion of the thermoplastic resin layer forms a matrix for the composite structure.

In this manner, a composite structure is associated with the antenna system. In these illustrative examples, the composite structure may be designed to have additional functions in addition to functioning as an antenna. With the integration of multiple systems in a platform, a reduction in platform weight may result from the use of structures that have multiple functions. Additionally, undesired resistance to air flow around the vehicle may be reduced. In this manner, performance of an aircraft may be increased as compared to currently-constructed aircraft.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Although an advantageous embodiment has been described with respect to aircraft, the advantageous embodiment may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, without limitation, a submarine, a bus, a personnel carrier, a tank, a train, an automobile, a spacecraft, a space station, a satellite, a surface ship, a power plant, a dam, a manufacturing facility, a building, and/or some other suitable object.

What is claimed is:

1. An apparatus comprising:
   a thermoplastic resin layer;
   a number of conductive elements on the thermoplastic resin layer, wherein the number of conductive elements has a configuration that forms an antenna system and the antenna system comprises a slot antenna system;
   a number of layers of reinforcement material, wherein the number of layers of reinforcement material form a reinforcement for a composite structure, and at least a portion of the thermoplastic resin layer forms a matrix for the composite structure, the thermoplastic resin layer, the number of conductive elements, and the number of layers of reinforcement material consolidated in a nonplanar configuration; and
   a composite layer including a fiberglass layer, a reinforcement layer, a thermoplastic resin layer of the composite layer, and a thermoset resin layer;
   wherein the antenna system is integrated into the composite structure, the composite structure comprising a wing of an aircraft such that the number of layers have a surface in a shape of the wing;
   wherein the number of conductive elements are formed on the thermoplastic resin layer prior to positioning the thermoplastic resin layer on one of the number of layers of reinforcement material;
   wherein the thermoplastic resin layer is flowed into and infused with two layers of the number of layers;
   wherein the thermoplastic resin layer is placed onto the composite layer;
   wherein the number of layers of reinforcement material are placed over the thermoplastic resin layer; and
   wherein the composite layer, the thermoplastic resin layer, and the number of layers of reinforcement material are consolidated to form the composite structure.

2. The apparatus of claim 1, wherein the thermoplastic resin layer is a first thermoplastic resin layer, the number of conductive elements is a first number of conductive elements forming a first antenna, and further comprising:
   a second resin layer, wherein at least a portion of the second resin layer is part of the matrix for the reinforcement; and
   a second number of conductive elements forming a second antenna, wherein a configuration of the second number of conductive elements on the second resin layer is a part of the antenna system.

3. The apparatus of claim 2, wherein at least one layer in the number of layers of reinforcement material separates the first resin layer and the second resin layer.

4. The apparatus of claim 1, wherein the number of conductive elements comprises at least one of an antenna, a control line, a radio frequency transmission line, a conductive radio frequency transmission line, a conductive trace, a capacitor, a switch, a resistor, and an inductor.

5. The apparatus of claim 1, wherein the resin layer and the number of layers of reinforcement material are consolidated to form a laminate in which the laminate is shaped to have a desired shape to form the composite structure.

6. The apparatus of claim 5, wherein the resin layer is selected from one of a thermoplastic resin layer and a thermoset resin layer.

7. The apparatus of claim 6, wherein thermoplastic resin in the thermoplastic resin layer is selected from at least one of a polyether ketone, a polyolefin, and a polyamide.

8. The apparatus of claim 1, wherein the reinforcement material in the number of layers of reinforcement material is selected from at least one of fiberglass, carbon, and graphite.

9. The apparatus of claim 1, wherein a layer in the number of layers of reinforcement material is in a form selected from one of a cloth, a tape, and woven fibers.

10. The apparatus of claim 1, wherein the antenna system is integrated into an aircraft structure without a pod.

11. The apparatus of claim 1, wherein the wing provides both an antenna function and a wing function.

12. The apparatus of claim 1, wherein the number of conductive elements comprise an antenna, a feed line, a number of capacitors, and a number of switches.

13. The apparatus of claim 2, wherein the composite structure comprises a wing of an unmanned aircraft.

14. A method for operating an antenna integrated into a wing of an aircraft, the method comprising:
   generating a signal in a number of conductive elements in a wing composite structure, wherein the wing composite structure comprises a matrix formed from at least a portion of a thermoplastic resin layer and a reinforcement formed from a number of layers of reinforcement material and wherein a configuration of the number of conductive elements forms an antenna system and the antenna system comprises a slot antenna system, wherein the wing composite structure and the antenna system are integrated into an aircraft structure without a pod, the wing composite structure and the antenna system having a nonplanar configuration of a surface of a wing of the aircraft structure, and the number of conductive elements comprising an antenna, a feed line, a number of capacitors, and a number of switches;
   wherein the number of conductive elements are formed on the thermoplastic resin layer prior to positioning the thermoplastic resin layer on one of the number of layers of reinforcement material;
   wherein the thermoplastic resin layer is flowed into and infused with two layers of the number of layers;

wherein the thermoplastic resin layer is placed onto a composite layer that includes a fiberglass layer, a reinforcement layer, a thermoplastic resin layer of the composite layer, and a thermoset resin layer;

wherein the number of layers of reinforcement material are placed over the thermoplastic resin layer; and wherein the composite layer, the thermoplastic resin layer, and the number of layers of reinforcement material are consolidated to form the composite structure.

15. The method of claim 14, wherein the signal is generated in the number of conductive elements with an electromagnetic signal received by the antenna system.

16. The method of claim 14, wherein the signal is an electromagnetic signal generated in the number of conductive elements by at least a portion of the number of conductive elements.

17. A method for forming an antenna system in a composite structure of an aircraft, the method comprising:

forming a number of conductive components in a configuration on a thermoplastic resin layer, wherein the configuration of the number of conductive components forms the antenna system and the antenna system comprises a slot antenna system;

positioning the thermoplastic resin layer with the number of conductive components with respect to a number of layers of reinforcement material;

consolidating the thermoplastic resin layer with the number of layers of reinforcement material to form the composite structure, wherein the antenna system is in the composite structure in which the composite structure has a substantially planar shape;

placing the composite structure on a mold; and changing a shape of the composite structure on the mold into a nonplanar shape for the composite structure to form the composite structure, wherein the nonplanar shape of the antenna system is integrated into the composite structure so as to provide a surface of the aircraft;

wherein the number of conductive components are formed on the thermoplastic resin layer prior to positioning the thermoplastic resin layer on one of the number of layers of reinforcement material;

wherein the thermoplastic resin layer is flowed into and infused with two layers of the number of layers;

wherein the thermoplastic resin layer is placed onto a composite layer that includes a fiberglass layer, a reinforcement layer, a thermoplastic resin layer of the composite layer, and a thermoset resin layer;

wherein the number of layers of reinforcement material are placed over the thermoplastic resin layer; and wherein the composite layer, the thermoplastic resin layer, and the number of layers of reinforcement material are consolidated to form the composite structure.

18. The method of claim 17, wherein a desired shape for the composite structure is selected from one of a wing, a horizontal stabilizer, a vertical stabilizer, a flap, an engine housing, and a fuselage.

19. The method of claim 17, wherein the thermoplastic resin layer is selected from at least one of a polyether ketone, a polyolefin, and a polyamide.

20. The method of claim 17, wherein the number of layers of reinforcement material is selected from at least one of fiberglass, carbon, and graphite.

* * * * *